US000001214H

United States Statutory Invention Registration [19]

[11] Reg. Number: H1214

[43] Published: Aug. 3, 1993

Liva et al.

[54] MULTIPLE POINT LASER DETONATION SYSTEM FOR EXPLOSIVE CHARGES

[75] Inventors: Michael Liva; Matthew Webb, both of Wayne, N.J.; Daniel Rontey, Woodstock, N.Y.

[73] Assignee: The United States of America as represented by the Secretary of the Army, Washington, D.C.

[21] Appl. No.: 897,629

[22] Filed: Jun. 12, 1992

[51] Int. Cl.[5] ..... F42C 19/00

[52] U.S. Cl. ..... 102/201

[58] Field of Search ..... 102/201, 430, 443, 469, 102/470, 472, 473, 475, 476, 492, 499, 701

[56] References Cited

U.S. PATENT DOCUMENTS

| | | | |
|---|---|---|---|
| 3,812,783 | 5/1974 | Yang et al. | 102/201 |
| 4,391,195 | 7/1983 | Shann | 102/201 |
| 4,711,181 | 12/1987 | Ringel et al. | 102/476 |
| 4,862,802 | 9/1989 | Streifer et al. | 102/201 |
| 4,862,804 | 9/1989 | Chawla et al. | 102/476 |
| 4,887,534 | 12/1989 | Dickovich et al. | 102/430 |
| 4,892,037 | 1/1990 | Betts | 102/201 |
| 4,917,017 | 4/1990 | Beltz | 102/470 |
| 4,982,667 | 1/1991 | Weimann | 102/476 |
| 5,052,302 | 10/1991 | Taddeo et al. | 102/470 |
| 5,147,978 | 9/1992 | Northrup et al. | 102/443 |
| 5,148,748 | 9/1992 | Yarrington | 102/201 |

FOREIGN PATENT DOCUMENTS

| | | | |
|---|---|---|---|
| WO88/07170 | 9/1988 | World Int. Prop. O. | 102/201 |

*Primary Examiner*—Harold J. Tudor

*Attorney, Agent, or Firm*—Anthony T. Lane; Edward Goldberg; Michael Sachs

[57] ABSTRACT

Apparatus for igniting a charge of propellant/explosive material comprising a source of laser light coupled by an optical fiber to ends of a plurality of optical fibers within the charge having their other ends coupled to a primer charge in an ignitor tube that is proximate an ignitor charge.

9 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MULTIPLE POINT LASER DETONATION SYSTEM FOR EXPLOSIVE CHARGES

GOVERNMENT INTEREST

The invention described herein may be manufactured, used and licensed by or for the Government for governmental purposes without the payment to us of any royalty thereon.

FIELD OF THE INVENTION

This invention is generally in the field of ignition systems for propellant/explosive charges, and more particularly relates to such systems employing laser detonators.

BACKGROUND OF THE INVENTION

Ignition of propellants/explosives from a remote control point has been accomplished by a centercore system in which a single ignitor tube is located in the center of the explosive charge. A pulse of electric current is passed through a bridge wire so as to cause the wire to vaporize and ignite a pyrotechnic contained within an end of the tube. This ignites an adjacent black powder primer which in turn ignites ignitor strands extending throughout the length of the tube. Because the tube is strong enough to initially contain the pressure resulting from the hot gases generated during the ignition, they are forced out of vent holes along the tube in the form of jets so as to penetrate the explosive charge and ignite it.

Because the rate of this penetration is limited, only about half of the material in the ignitor strands and about 50% of the propellant/explosive charge are burned when the projectile is expelled. This inefficient use of material is costly, but, in addition, the fact that the amount of the charge ignited varies has adverse functional effects. Thus, if charges are used to propel projectiles, the initial velocities are different so as to affect the ballistics, and if they are used in blasting rock, the forces created vary from charge to charge. Furthermore, the slow and uneven spread of ignition of the charge can create standing pressure waves having dangerous effects, e.g., it can blow the breech of a gun.

Attempts have been made to solve these problems through modifying the centercore system. The vent holes in the ignition tube have been positioned farther from the pyrotechnic end, and forward venting tips have been used, but the improvements have been marginal. In addition, an electrically operated system such as just described is subject to inadvertent initiation from electromagnetic radiation, spurious electrical signals and static discharges. Furthermore, it has been reported that elimination of the bridgewire would eliminate at least 80% of the test procedures required to ensure safety.

BRIEF DESCRIPTION OF AN EMBODIMENT OF THE INVENTION

In apparatus incorporating this invention, light from a remote laser source is coupled via an optical fiber patch cord to one end of each of a plurality of optical ignitor fibers having their other ends respectively coupled to initial charges in a plurality of ignitor tubes. Ignitor strands that extend throughout the length of each tube have ends adjacent the initial charge. The ignitor tubes may be made of metal or plastic that is strong enough to withstand the initial pressure generated by ignition of the ignitor strands, and have vent openings therealong through which jets of hot gases due to that ignition extend so as to ignite a bed of propellant/explosive charge. The use of a plurality of ignitor tubes that are simultaneously ignited by a pulse of laser light causes nearly simultaneous ignition of all parts of the bed of propellant/explosive charge. This permits the use of less propellant/explosive charge so as to make a significant reduction in cost, and causes a marked increase in the consistency of functional performance. Furthermore, because false ignition is practically eliminated, safety is increased.

BRIEF DESCRIPTION OF THE DRAWINGS

Various embodiments of the invention are described below with reference to the accompanying drawings, in which corresponding components in the different figures of the drawings are identified by the same reference designation, wherein.

DETAILED DESCRIPTION OF THE INVENTION

Figure 1:
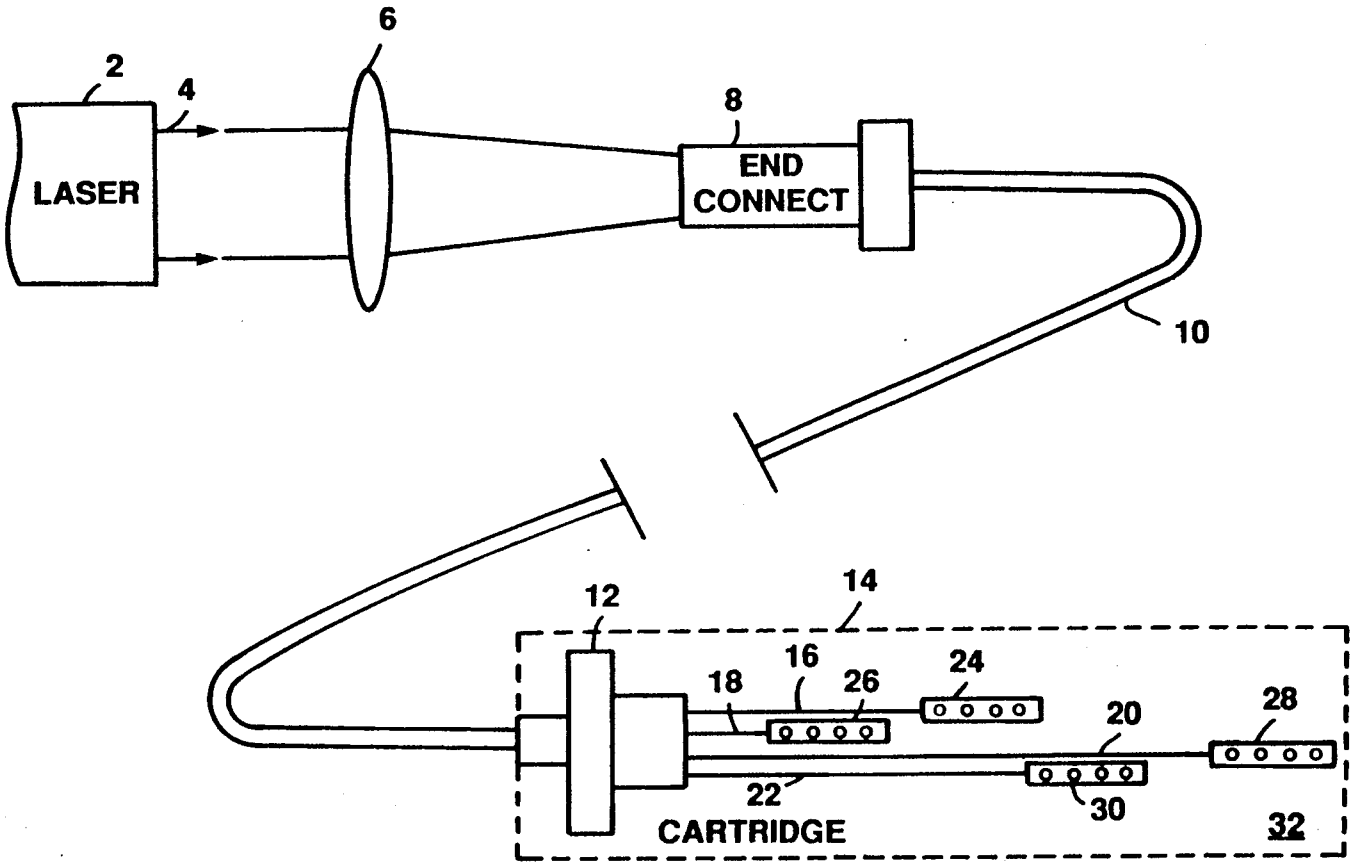
FIG. 1 is a schematic representation of an ignition system incorporating the invention.

In the particular embodiment shown in FIG. 1, an Nd:YAG laser 2 delivers a pulse of light represented by the arrow 4 having an energy of up to 10.0 Joules and a pulse width of approximately 1.0 ms at the Nd wavelength of 1.06 microns. A lens 6 of such focal length that the converging cone of light does not have a numeric aperture greater that 0.2 directs the laser light onto an end connection 8 for an optical fiber 10. The end connection 8 is the standard SMA type with a flat end polish of the type normally used for high power laser optics to ensure that there is no degradation. The fiber optic 10 is a step index, plastic clad silica with a core diameter of 600.0 to 1000.0 microns.

Figure 2:
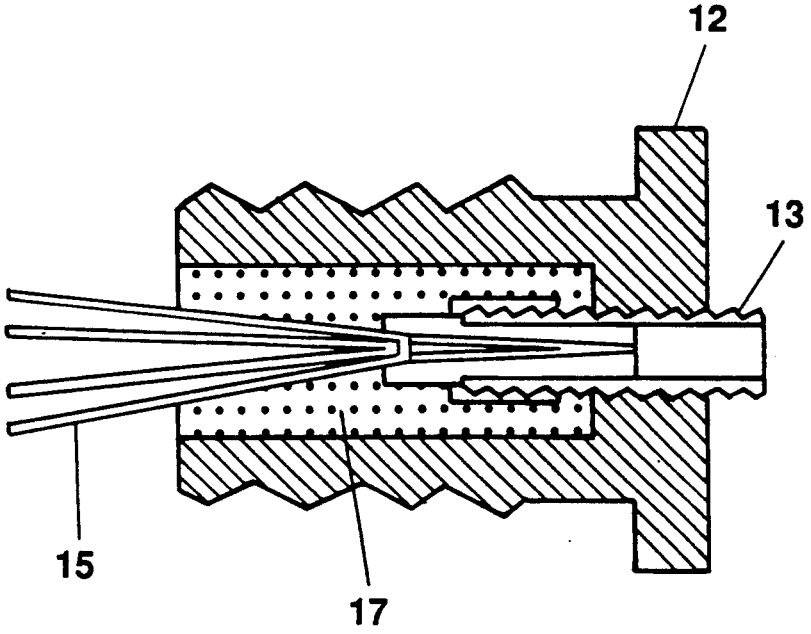
FIG. 2 shows a longitudinal cross-sectional view of a plug of one embodiment of the invention.

A base plug 12 of a cartridge 14 receives and holds the other end of the optical fiber 10 and aligns it with optical ignitor fibers 16, 18, 20 and 22 through a pressure retaining feed through. As shown in FIG. 2, the plug 12 includes an alignment bushing 13 (SMA type fiber optic industry standard bushing) in the base of plug 12 spaced by an amount depending on the number of ignitor fibers 15 so that a minimum of 100.0 mJ is transmitted to each. Note that base plug 12 is a modified M83 plug (standard U.S. Army part number). The pressure retaining feedthrough is provided by epoxy 17, as shown.

Figure 3A:
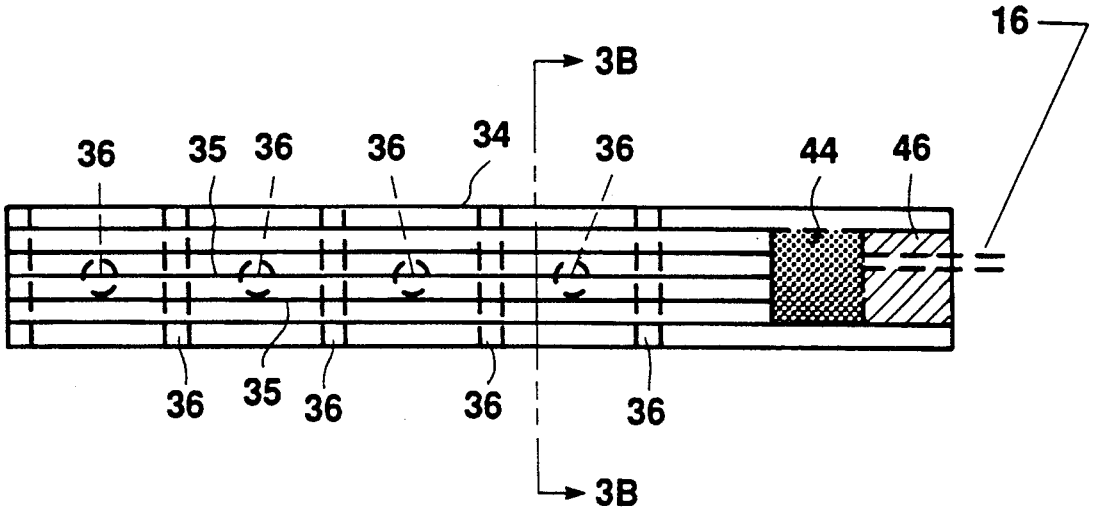
FIG. 3A illustrates a partial cross-sectional view of an ignitor tube of one embodiment of the invention.

Ignitor tubes 24, 26, 28 and 30, such as shown in more detail in FIG. 3A, are coupled to the opposite ends of the ignitor fibers 16, 18, 20, and 22, and are distributed within the base charge 32 contained within the shell 14. Only four ignitor tubes are shown, but more can be used. In operation, of course, the shell 14 is mounted in the breech end of a gun barrel, and the projectile is ahead of it.

As shown in FIG. 3A, each of the ignitor tubes 24, 26, 28 and 30 is comprised of a tube 34 that can be made of metal, plastic or some combustible material. The tube 34 must be capable of containing the pressure initially generated when the ignitor material is ignited so as to force jets of hot gas out through vent openings 36, in this example. Typically, the pressure can reach 1400.0 PSI (pounds per square inch), and with some configurations it may reach 7000.0 PSI.

Figure 3B:
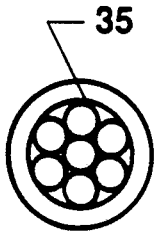
FIG. 3B is an end view of FIG. 3A in the direction of arrows 3B—3B.

The tube 34 is filled with strands 35 of ignitor material, as better seen in the end view of FIG. 3B, such as benite or oxite that are in contact at one end with primer material 44 such as black powder. An ignitor fiber, such as optical fiber 16, is retained by an epoxy resin 46 within the tube 34 so that its end directs laser light into the primer charge 44, for example.

In operation, the laser 2 is given an external fire signal so as to produce a pulse of laser light that is focussed by the lens 6 into the connecting fiber or patch cord 10 via the end connection 8. The connecting fiber 10 delivers the light energy through the pressure resistant base plug 12 to the ignitor fibers 16, 18, 20 and 22, and they conduct it to the primer charges such as 44 of FIG. 3A. The site of the primer charge is scaled depending upon the volume of propellant to be ignited. When a primer charge 44 absorbs this energy, it ignites and in turn ignites the ignitor strands 35. Combustion of the ignitor strands 34 causes jets of hot gas to emerge from the vent openings such as 36 of FIG. 3A and ignite the main charge.

The table below gives some typical specifications for the design of ignitors including the ignitor material, number of ignitors, geometrical shape (see FIGS. 4, 5, 6, and 7) and proper propellant. Other configurations are possible.

Figure 4:
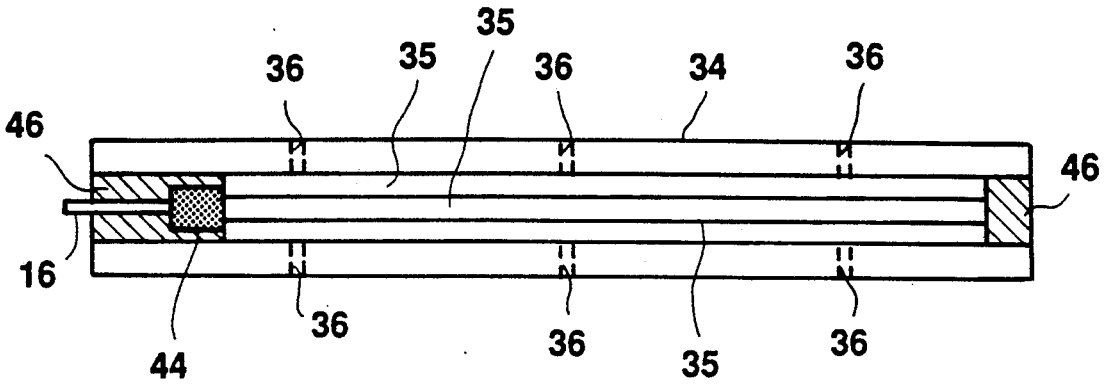
FIGS. 4 through 7 illustrate partial cross-sectional views of four different configurations of ignitor tubes, respectively, for various embodiments of the invention.
Figure 5:
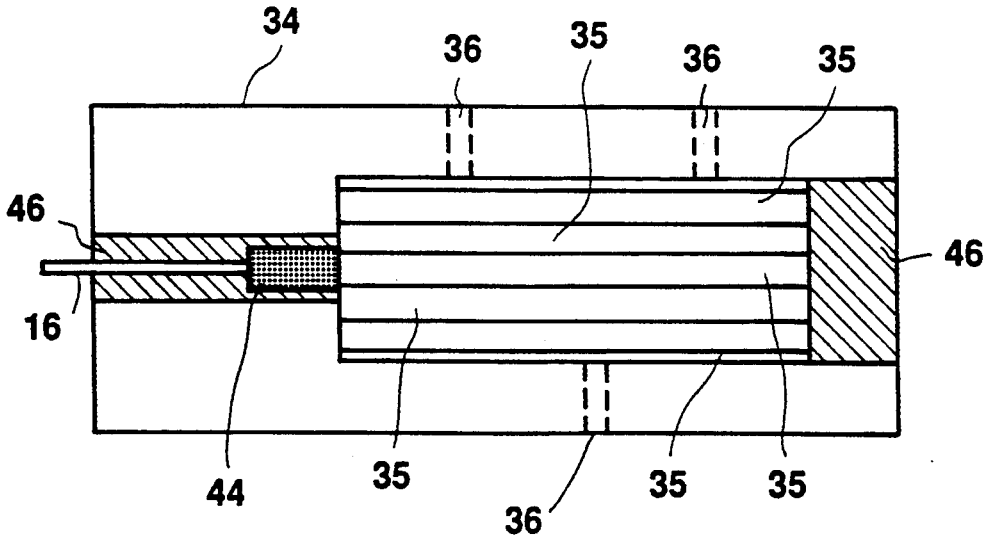
Figure 6:
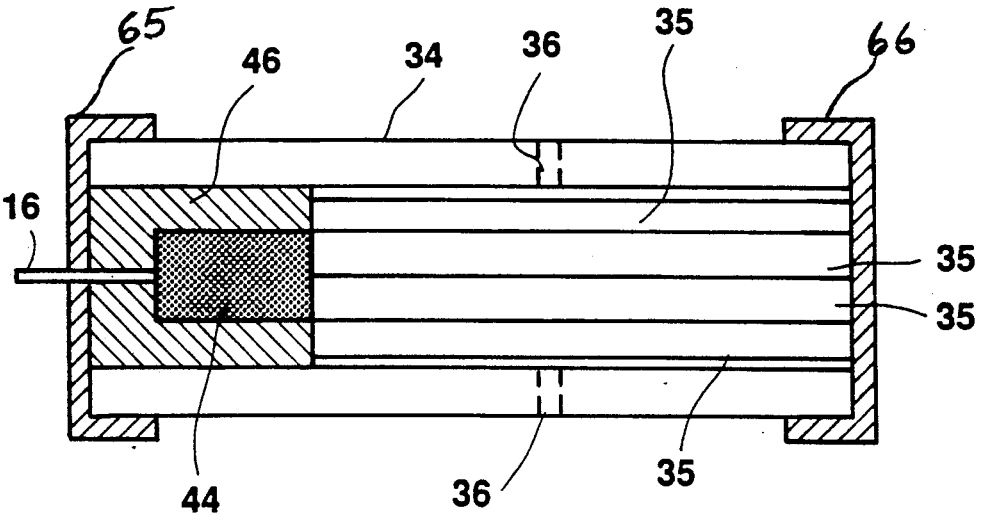

In FIGS. 4–7, the caption numbers are the same, and refer to the same elements as the like-numbered captions do in FIG. 3A. In FIG. 4, additional primer charge 46 is placed at both ends of the tube rather than at only the ignitor fiber end of the tube as in FIG. 3A. In FIG. 5, the length of strands 35 has been shortened, compared to FIG. 4, whereas the amount of primer charge 46 has been more than doubled. The ignitor fiber is also longer. In FIG. 6, end caps 65 and 66 have been added to the configuration in FIG. 3A. And, in FIG. 7, more ignitor is used than in FIG. 3A.

TABLE 1

Figure 7:
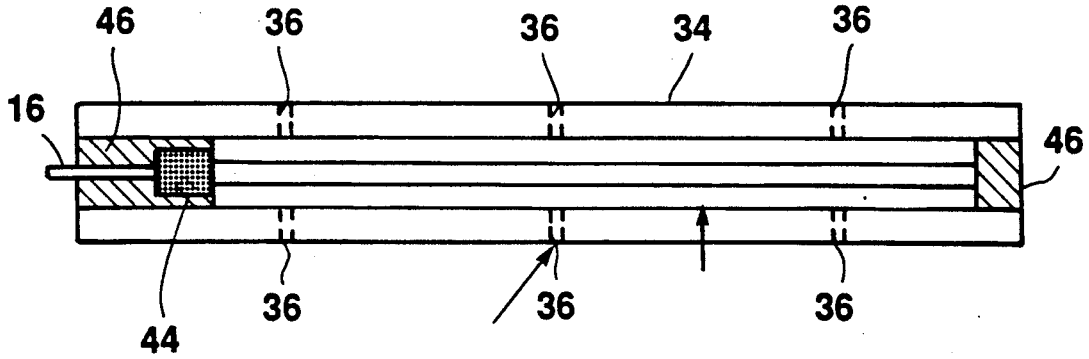

| | IGNITOR CONFIGURATIONS | | | |
|---|---|---|---|---|
| CONFIGURATION | FIG. 4 | FIG. 5 | FIG. 6 | FIG. 7 |
| PRIMER/IGNITOR | .06 gm | .06 gm | .06 gm | .06 gm |
| IGNITOR MATERIAL | BENITE | BENITE | OXITE | BENITE/OXITE |
| MATERIAL/IGNITOR | 4.08 gm | 4.08 gm | 5.68 gm | 0.82/4.54 gm |
| NUMBER OF IGNITORS | 5 | 5 | 5 | 5 |
| TOTAL IGNITOR MATERIAL | 20.4 gm | 20.4 gm | 28.4 gm | 26.8 gm |
| IGNITOR SHAPE | 0.25 ID × 4.6 L | 0.56 ID × 1.27 L | 0.5 ID × 1.6 L | 0.25 ID × 4.6 L |
| VENTING/IGNITOR | 12 × 0.116 D | 5 × 0.125 D | 4 × 0.139 D | 14 × 0.116 D |
| VENT AREA/IGNITOR | 0.128 sq. in. | 0.061 sq. in. | 0.061 sq. in. | 0.169 sq. in. |
| TUBE MATERIAL | PHENOLIC | PHENOLIC | METAL | PHENOLIC |
| PROPELLANT | M 30 | M 30 | LOVA | LOVA |

Although various embodiments of the invention have been shown and described above, they are not meant to be limiting. Those of skill in the art may recognize certain modifications to such embodiments, which modifications are meant to be covered by the spirit and scope of the appended claims.

What is claimed is:

1. Apparatus for detonating an explosive charge bed comprising:

a plurality of ignitors in said explosive charge bed, said ignitors being responsive to coherent light for ignition;

an optical fiber patch cord;

an alignment bushing having means for optical coupling to said optical fiber patch cord;

a plurality of ignitor fibers optically coupled between said alignment bushing and said ignitors;

means for providing a pulse of coherent light; and means of or optically coupling one end of said patch cord to said means for providing a pulse of coherent light, the other end of said patch cord being coupled to said alignment bushing.

2. Apparatus as set forth in claim 1 wherein said means for providing a pulse of coherent light includes a laser energy source.

3. Apparatus as set forth in claim 1 comprising a cartridge having a shell containing said explosive charge bed wherein said alignment bushing comprises an optical pressure feedthrough coupling mounted in a base of said shell.

4. Apparatus as set forth in claim 1, wherein each ignitor includes a tube made of metal.

5. Apparatus as set forth in claim 1, wherein each ignitor includes a tube made of plastic.

6. Apparatus as set forth in claim 1, wherein each ignitor includes a tube made of combustible material.

7. Apparatus as set forth in claim 1, wherein each ignitor includes a primer of black powder positioned so as to receive light from its respective optical fiber.

8. Apparatus as set forth in claim 1, wherein each ignitor includes ignitor material made of benite.

9. Apparatus as set forth in claim 1, wherein each ignitor includes ignitor material made of oxite.

* * * * *